(12) United States Patent
Takahashi et al.

(10) Patent No.: US 10,115,981 B2
(45) Date of Patent: Oct. 30, 2018

(54) FUEL CELL STACK

(71) Applicant: HONDA MOTOR CO., LTD., Minato-Ku, Tokyo (JP)

(72) Inventors: Motohiro Takahashi, Wako (JP); Hiroaki Ohta, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 26 days.

(21) Appl. No.: 15/271,928

(22) Filed: Sep. 21, 2016

(65) Prior Publication Data

US 2017/0092965 A1    Mar. 30, 2017

(30) Foreign Application Priority Data

Sep. 25, 2015 (JP) .................................. 2015-188382
Sep. 7, 2016 (JP) .................................. 2016-174613

(51) Int. Cl.
| H01M 8/04007 | (2016.01) |
| H01M 8/04082 | (2016.01) |
| H01M 8/2484 | (2016.01) |
| H01M 8/1018 | (2016.01) |

(52) U.S. Cl.
CPC ... *H01M 8/04067* (2013.01); *H01M 8/04201* (2013.01); *H01M 8/2484* (2016.02); *H01M 2008/1095* (2013.01); *H01M 2250/20* (2013.01); *Y02T 90/32* (2013.01)

(58) Field of Classification Search
USPC ....... 374/141, 142, 100, 163, 179, 146, 149, 374/147
See application file for complete search history.

(56) References Cited

U.S. PATENT DOCUMENTS

| 2009/0233139 A1* | 9/2009 | Suzuki .............. H01M 8/04067 429/434 |
| 2012/0115058 A1 | 5/2012 | Darling et al. |
| 2012/0193086 A1* | 8/2012 | van Dijk .................. G01K 1/14 165/287 |
| 2013/0343427 A1* | 12/2013 | Helmschrott .......... G01K 13/02 374/147 |

FOREIGN PATENT DOCUMENTS

| JP | 2009224194 A | 1/2009 |
| JP | 2009224194 A | 10/2009 |
| JP | 2010-282823 A | 12/2010 |
| JP | 2013503438 A | 1/2013 |
| JP | 2014006260 A | 1/2014 |

OTHER PUBLICATIONS

Japanese Office Action dated Mar. 6, 2018 issued over the corresponding Japanese Patent Application No. 2016-174613 and the English translation thereof.

* cited by examiner

*Primary Examiner* — Carmen V Lyles-Irving
(74) *Attorney, Agent, or Firm* — Carrier Blackman & Associates, P.C.; Joseph P. Carrier; Jeffrey T. Gedeon

(57) ABSTRACT

An oxygen-containing gas discharge manifold member is provided for a first end plate of a fuel cell stack. The oxygen-containing gas discharge manifold member has a first opening connected to a non-circular oxygen-containing gas discharge passage and a second opening connected to a circular external pipe. In a front view of the first end plate, in an area where the opening shape of the first opening and the opening shape of the second opening are overlapped with each other a sensing part is provided.

7 Claims, 7 Drawing Sheets

FUEL CELL STACK

CROSS-REFERENCE TO RELATED APPLICATION

This application is based upon and claims the benefit of priority from Japanese Patent Applications No. 2015-188382 filed on Sep. 25, 2015 and No. 2016-174613 filed on Sep. 7, 2016, the contents all of which are incorporated herein by reference.

BACKGROUND OF THE INVENTION

Field of the Invention

The present invention relates to a fuel cell stack including a plurality of power generation cells which are stacked together. Each of the power generation cells is formed by stacking a membrane electrode assembly and a separator. The membrane electrode assembly includes electrodes and an electrolyte membrane interposed between the electrodes.

Description of the Related Art

For example, a solid polymer electrolyte fuel cell employs a polymer ion exchange membrane as an electrolyte membrane, and the electrolyte membrane is interposed between an anode and a cathode to form a membrane electrode assembly (MEA). The membrane electrode assembly and a pair of separators sandwiching the membrane electrode assembly make up a power generation cell for generating electricity. In use, typically, a predetermined number of the power generation cells are stacked together, and end plates are provided at both ends of the power generation cells in the stacking direction to form a fuel cell stack, which is, for example, mounted in a fuel cell vehicle.

In order to suitably control the operating condition and non-operating condition, etc., various sensors are attached to the fuel cell. For example, a scavenging process is performed to decrease water content in the fuel cell using dry air after the fuel cell ceases to operate. In this process, it is desired to accurately check the water content in the fuel cell. To this end, a fuel cell system disclosed in Japanese Laid-Open Patent Publication No. 2010-282823 is known.

This fuel cell system is equipped with a temperature sensor for detecting temperature of an area where the decrease in the temperature over time is comparatively small due to the influence of the heat of condensation, the area being in the fuel cell which is left in the non-operating state after the end of operation of the fuel cell system. Then, the temperature detected by the temperature sensor is handled as an internal temperature of the fuel cell. Based on the behavior of the temperature at the time point when the decrease in the temperature is small, the internal water content of the fuel cell is estimated.

Specifically, the temperature sensor is provided for the power generation cell provided at a middle portion of the fuel cell stack in the stacking direction. That is, in the power generation cell, an oxygen-containing gas manifold is formed in the separator, and a temperature sensor is provided in the oxygen-containing gas manifold. The temperature change on the surface of the oxygen-containing gas manifold is similar to the temperature change in the fuel cell stack. According to the disclosure, the surface temperature of the oxygen-containing gas manifold is detected, and the detected temperature can be seen as the internal temperature of the fuel cell stack.

SUMMARY OF THE INVENTION

However, in Japanese Laid-Open Patent Publication No. 2010-282823, since the temperature sensor is attached to the power generation cell in the fuel cell stack, the operation of attaching the temperature sensor is laborious, and the operation of replacing the temperature sensor, etc. is considerably time consuming.

Therefore, it is desired to attach various sensors such as the temperature sensor to the outside of the fuel cell stack. In the fuel cell stack, fluid manifolds for supplying or discharging fluids (fuel gas, oxygen-containing gas, or coolant) are provided in at least one of the end plates. The fluid manifolds are connected to fluid passages (e.g., reactant gas passages or coolant passages) in the fuel cell stack, respectively. Therefore, one idea is to attach sensors to fluid manifolds exposed to the outside of the end plate.

However, in most cases, the fluid passages of the power generation cell have non-circular shapes such as a rectangular, e.g., an oblong shape or a trapezoidal shape while external pipes connected to the fluid manifolds have cylindrical (circular) shapes. Therefore, the flow field shapes in the fluid manifolds become complicated, and it is difficult to perform sensing by the sensor highly accurately.

The present invention has been made in relation to the technique of this type, and an object of the present invention is to provide a fuel cell stack having simple and economical structure in which it is possible to perform measurement by a sensor member highly accurately.

A fuel cell stack according to the present invention includes a plurality of power generation cells which are stacked together in a stacking direction, and end plates provided at both ends of the power generation cells in the stacking direction. Each of the power generation cells is formed by stacking a membrane electrode assembly and a separator. The membrane electrode assembly includes electrodes and an electrolyte membrane interposed between the electrodes. A fluid passage extends through the power generation cells, for allowing fluid of a reactant gas or a coolant to flow in the stacking direction of the power generation cells.

A manifold member connecting the fluid passage and an external pipe is provided for one of the end plates. The manifold member has a first opening connected to the fluid passage and a second opening connected to the external pipe. The first opening and the second opening have different opening shapes. In a front view of one of the end plates, in an area where the opening shape of the first opening and the opening shape of the second opening are overlapped with other, a sensing part of a sensor member for detecting the state of the fluid is provided.

Further, preferably, in the fuel cell stack, the sensor member has a rod shape, and oriented in a direction intersecting with a direction in which the fluid flows.

In the fuel cell stack, the sensor member has a temperature sensor having a rod shape, and the temperature sensor is disposed at an angle with respect to a direction of gravity.

In the fuel cell stack, the sensor member includes a sensor bracket that is attached to the manifold member, the temperature sensor is provided closer to one end of the sensor bracket than to the other end of the sensor bracket, and an attaching screw that is screwed into the manifold member is provided closer to the other end of the sensor bracket than to the one end of the sensor bracket.

In the fuel cell stack, the manifold member includes a hollow cylindrical body having the second opening, and a thick portion that protrudes outwards from an outer circumference of the body, a screw hole into which the attaching screw is screwed is formed in the thick portion.

In the fuel cell stack, the first opening has a non-circular shape with a major axis and a minor axis, and a length of the first opening along the major axis is longer than a length of the second opening.

In the fuel cell stack, the sensing part is placed at an approximately central position of the first opening and the second opening in a width direction.

In the present invention, the sensing part of the sensor member is provided in the area where the opening shape of the first opening and the opening shape of the second opening are overlapped with each other in a front view of the end plate. In the structure, the sensing part of the sensor member is provided reliably in the area where the fluid flows between the first opening and the second opening. Therefore, the state of the fluid can be checked easily. Accordingly, with the simple and economical structure, it becomes possible to accurately perform measurement by the sensor member highly accurately.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
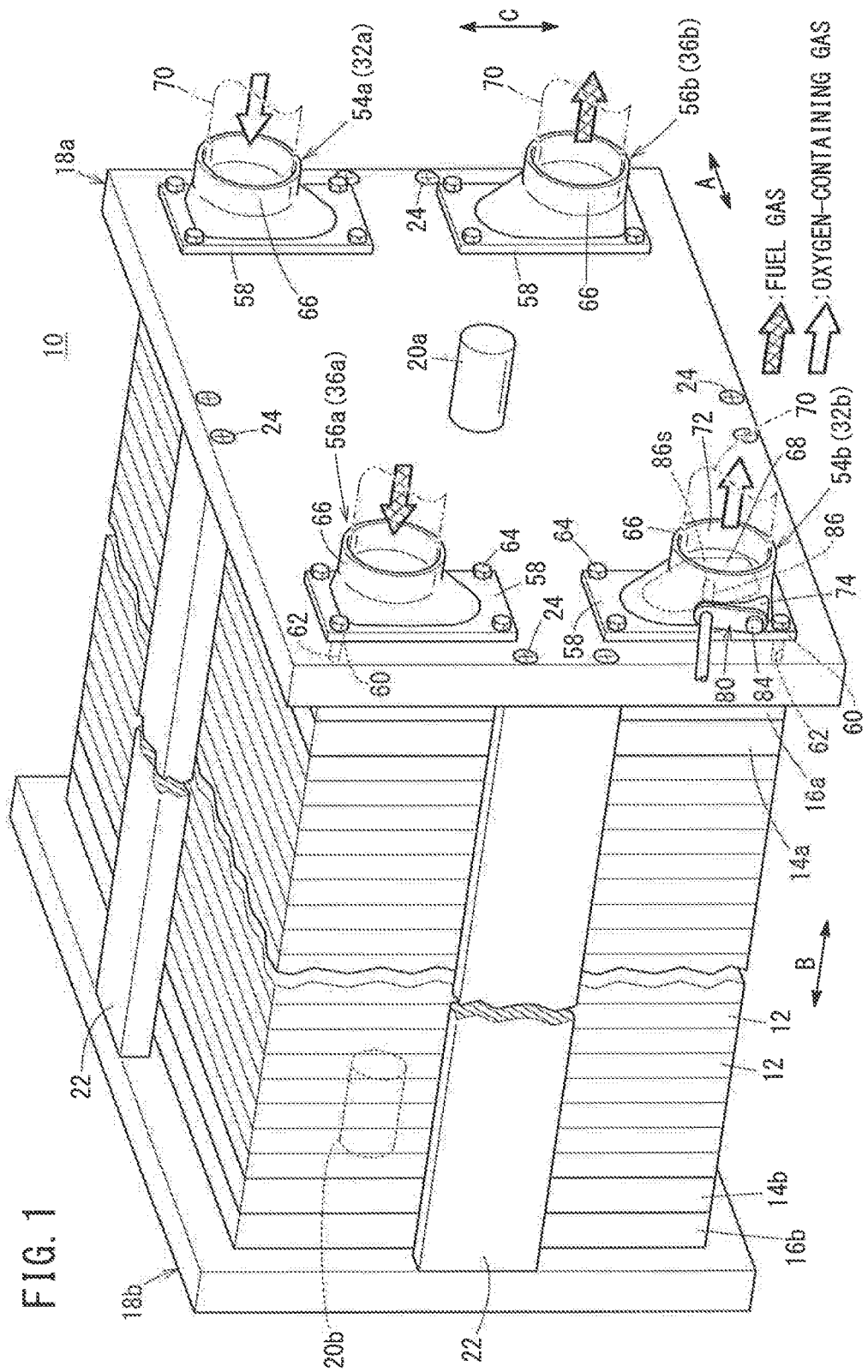
FIG. 1 is a perspective view schematically showing a fuel cell stack according to an embodiment of the present invention, as viewed from a first end plate.

A fuel cell stack 10 according to a first embodiment of the present invention shown in FIG. 1 is mounted, e.g., in a fuel cell electric vehicle (not shown). The fuel cell stack 10 is formed by stacking a plurality of power generation cells 12 in a horizontal direction indicated by an arrow B such that electrode surfaces of the power generation cells 12 stand upright. It should be noted the fuel cell stack 10 may be formed by stacking a plurality of power generation cells 12 in the direction of gravity indicated by an arrow C.

At one end of the power generation cells 12 in a stacking direction, a first terminal plate 14a is provided. A first insulating plate 16a is provided outside the first terminal plate 14a. A first end plate 18a is provided outside the first insulating plate 16a. At the other end of the power generation cells 12 in the stacking direction, a second terminal plate 14b is provided. A second insulating plate 16b is provided outside the second terminal plate 14b. A second end plate 18b is provided outside the second insulating plate 16b.

A first power output terminal 20a extends outward from a substantially central position of the first end plate 18a having a rectangular shape. The first power output terminal 20a is connected to the first terminal plate 14a. A second electric power output terminal 20b extends outward from a substantially central position of the second end plate 18b having a rectangular shape. The second electric power output terminal 20b is connected to the second terminal plate 14b.

Coupling bars 22 are provided somewhere on respective sides of the first end plate 18a and the second end plate 18b. Both ends of each of the coupling bars 22 are fixed to the first end plate 18a and the second end plate 18b using screws 24 for applying a tightening load to the power generation cells 12 in the stacking direction indicated by the arrow B.

Figure 2:
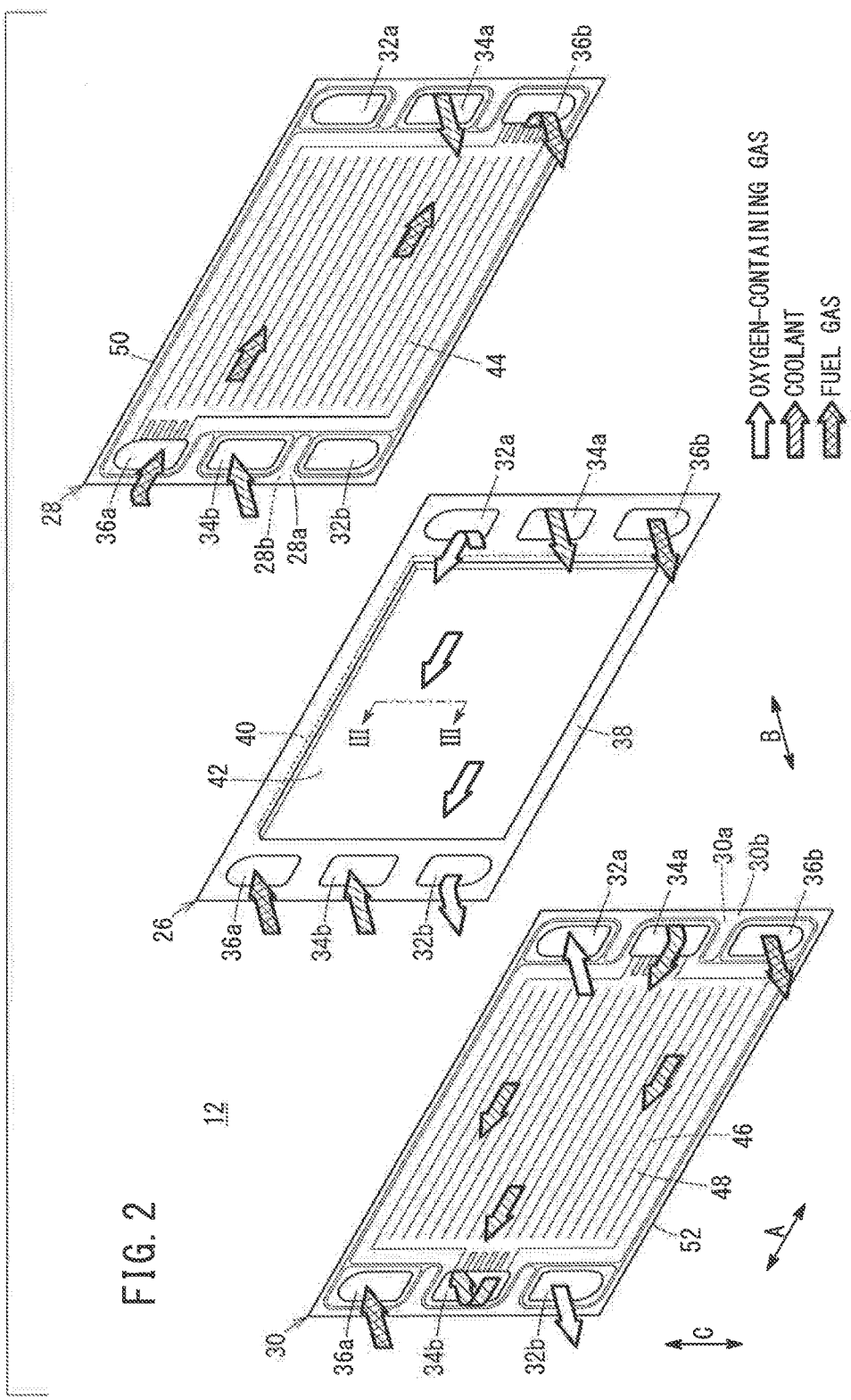
FIG. 2 is an exploded perspective view showing main components of a power generation cell of the fuel cell stack.

As shown in FIG. 2, the power generation cell 12 includes a membrane electrode assembly 26, and an anode separator 28 and a cathode separator 30 sandwiching the membrane electrode assembly 26.

The anode separator 28 and the cathode separator 30 are made of steel plates, stainless steel plates, aluminum plates, plated steel sheets, or metal plates with surfaces processed by anti-corrosive surface treatment. Each of the anode separator 28 and the cathode separator 30 has a rectangular (oblong or square) surface, and is formed by corrugating a thin metal plate by press forming to have ridges and recesses in cross section. For the anode separator 28 and the cathode separator 30, for example, carbon separators may be used instead of metal separators.

At one end of the power generation cell 12 in the longitudinal direction indicated by the arrow A, an oxygen-containing gas supply passage (fluid passage) 32a, a coolant supply passage (fluid passage) 34a, and a fuel gas discharge passage (fluid passage) 36b are provided. The oxygen-containing gas supply passage 32a, the coolant supply passage 34a, and the fuel gas discharge passage 36b extend through the power generation cells 12 in the direction indicated by the arrow B. An oxygen-containing gas is supplied through the oxygen-containing gas supply passage 32a. A coolant is supplied through the coolant supply passage 34a. A fuel gas such as a hydrogen-containing gas is discharged through the fuel gas discharge passage 36b.

The oxygen-containing gas supply passage 32a, the coolant supply passage 34a, and the fuel gas discharge passage 36b are non-circular passages, e.g., substantially rectangular passages. The oxygen-containing gas supply passage 32a, the coolant supply passage 34a, and the fuel gas discharge passage 36b may have any shape, i.e., any of various shapes such as a square shape, trapezoidal shape, a pentagon shape, a substantially triangular shape, a rhombic shape, a polygonal shape, an oval shape, or may have a shape formed by combining any of these shapes. The shape is not restricted to a particular one. Further, preferably, the corners of each side have an R shape (curved shape).

At the other end of the power generation cell 12 in the longitudinal direction, a fuel gas supply passage (fluid passage) 36a, a coolant discharge passage (fluid passage) 34b, and an oxygen-containing gas discharge passage (fluid passage) 32b are provided. The fuel gas supply passage 36a, the coolant discharge passage 34b, and the oxygen-containing gas discharge passage 32b extend through the power generation cell 12 in the direction indicated by the arrow B. The fuel gas is supplied through the fuel gas supply passage 36a, the coolant is discharged through the coolant discharge passage 34b, and the oxygen-containing gas is discharged through the oxygen-containing gas discharge passage 32b.

The fuel gas supply passage 36a, the coolant discharge passage 34b, and the oxygen-containing gas discharge passage 32b are non-circular passages as in the case of the oxygen-containing supply passage 32a, the coolant supply passage 34a, and the fuel gas discharge passage 36b.

Figure 3:
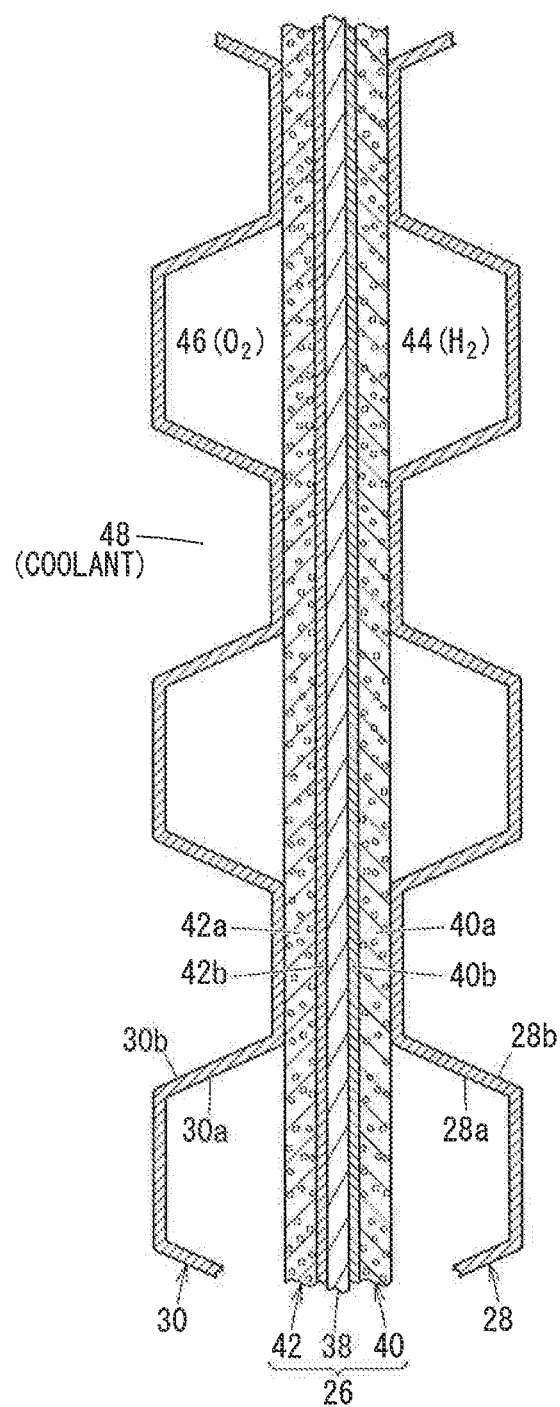
FIG. 3 is a cross sectional view showing the power generation cell, taken along a line III-III in FIG. 2.

As shown in FIG. 3, the membrane electrode assembly 26 includes an anode 40, a cathode 42, and a solid polymer electrolyte membrane 38 interposed between the anode 40 and the cathode 42. The solid polymer electrolyte membrane 38 is formed by impregnating a thin membrane of perfluorosulfonic acid with water, for example.

The anode 40 has a gas diffusion layer 40a made of a carbon paper and so on, and an electrode catalyst layer 40b. The electrode catalyst layer 40b is formed by depositing porous carbon particles uniformly on the surface of the gas diffusion layer 40a, the porous carbon particles carrying platinum alloy on the surface of the porous carbon particles. The electrode catalyst layer 40b is formed on one surface of the solid polymer electrolyte membrane 38.

The cathode 42 has a gas diffusion layer 42a made of a carbon paper and so on, and an electrode catalyst layer 42b. The electrode catalyst layer 42b is formed by depositing porous carbon particles uniformly on the surface of the gas diffusion layer 42a, the porous carbon particles carrying platinum alloy on the surface of the porous carbon particles. The electrode catalyst layer 42b is formed on the other surface of the solid polymer electrolyte membrane 38.

As shown in FIG. 2, the anode separator 28 has a fuel gas flow field 44 on its surface 28a facing the membrane electrode assembly 26. The fuel gas flow field 44 connects the fuel gas supply passage 36a and the fuel gas discharge passage 36b. The fuel gas flow field 44 includes a plurality of straight flow grooves (or wavy flow grooves) extending in the direction indicated by the arrow A.

The cathode separator 30 has an oxygen-containing gas flow field 46 on its surface 30a facing the membrane electrode assembly 26. The oxygen-containing gas flow field 46 connects the oxygen-containing gas supply passage 32a and the oxygen-containing gas discharge passage 32b. The oxygen-containing gas flow field 46 includes a plurality of straight flow grooves (or wavy flow grooves) extending in the direction indicated by the arrow A.

A coolant flow field 48 is formed between a surface 28b of the anode separator 28 and a surface 30b of the adjacent cathode separator 30. The coolant flow field 48 is connected to the coolant supply passage 34a and a coolant discharge passage 34b. The coolant flow field 48 extends in the horizontal direction. In the coolant flow field 48, the coolant flows over the electrode area of the membrane electrode assembly 26.

A first seal member 50 is formed integrally with the surfaces 28a, 28b of the anode separator 28 and is provided along the outer edge of the anode separator 28. A second seal member 52 is formed integrally with the surfaces 30a, 30b of the cathode separator 30, and is provided along the outer edge of the cathode separator 30.

Each of the first seal member 50 and the second seal member 52 is made of a seal member having elasticity such as packing material, cushion material, or seal material, cushion material, or packing material such as EPDM (ethylene propylene diene methylene rubber), NBR (nitrile butadiene rubber), fluoro rubber, silicone rubber, fluorosilicone rubber, butyl rubber, natural rubber, styrene rubber, chloroprene rubber, and acrylic rubber.

As shown in FIG. 1, an oxygen-containing gas supply manifold member 54a, an oxygen-containing gas discharge manifold member 54b, a fuel gas supply manifold member 56a, and a fuel gas discharge manifold member 56b are attached to the first end plate 18a. The oxygen-containing gas supply manifold member 54a, the oxygen-containing gas discharge manifold member 54b, the fuel gas supply manifold member 56a, and the fuel gas discharge manifold member 56b are made of resin material. As the resin material, for example, PBT (polybutylene terephthalate), PPS (Poly Phenylene Sulfide), PPE (Poly Phenylene Ether), or PAI (polyamide-imide) is used. Each of the manifold members may be formed integrally with the first end plate 18a.

The oxygen-containing gas discharge manifold member 54b has a flange 58 which protrudes outwardly. The flange 58 has a plurality, e.g., four holes 60, and the first end plate 18a has screw holes 62 whose axis aligns with the holes 60. Bolts 64 are inserted into the holes 60, and screwed into the screw holes 62 to fix the flange 58 to the first end plate 18a.

Figure 4:
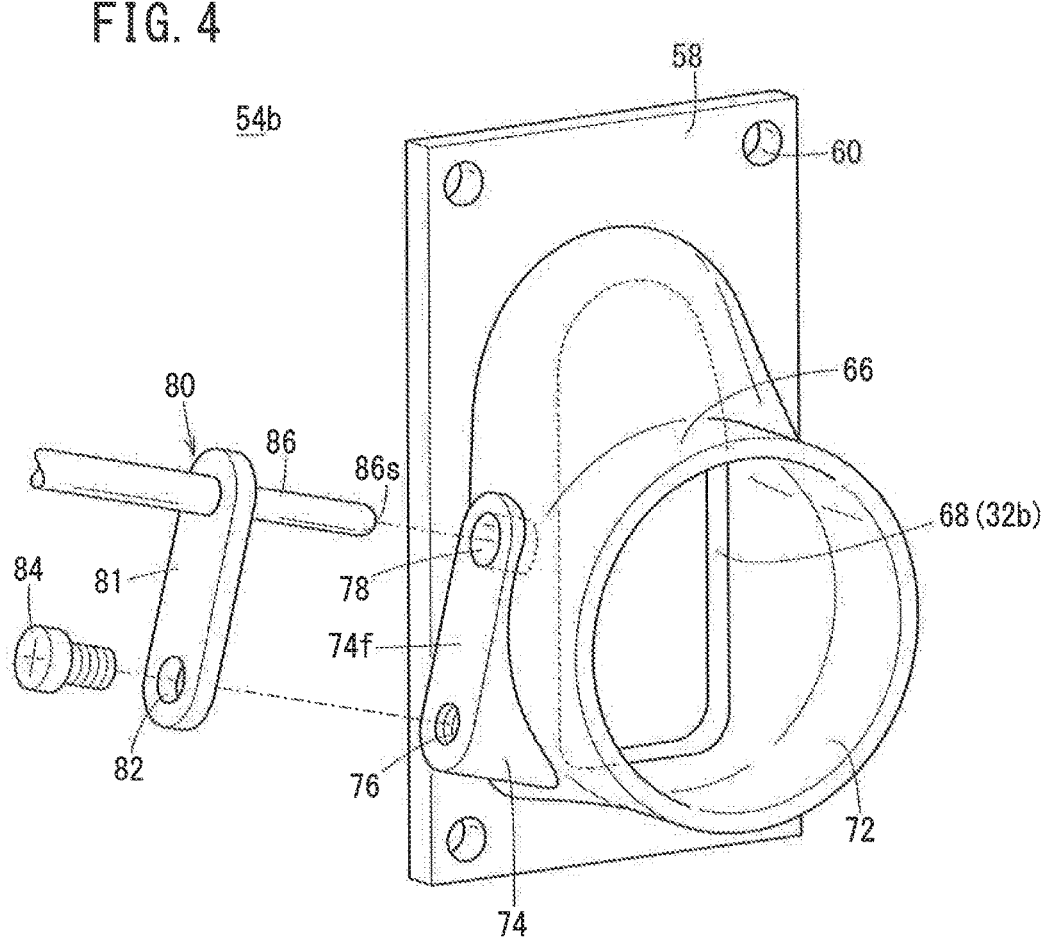
FIG. 4 is an exploded perspective view showing an oxygen-containing gas discharge manifold member and a sensor member of the fuel cell stack.
Figure 5:
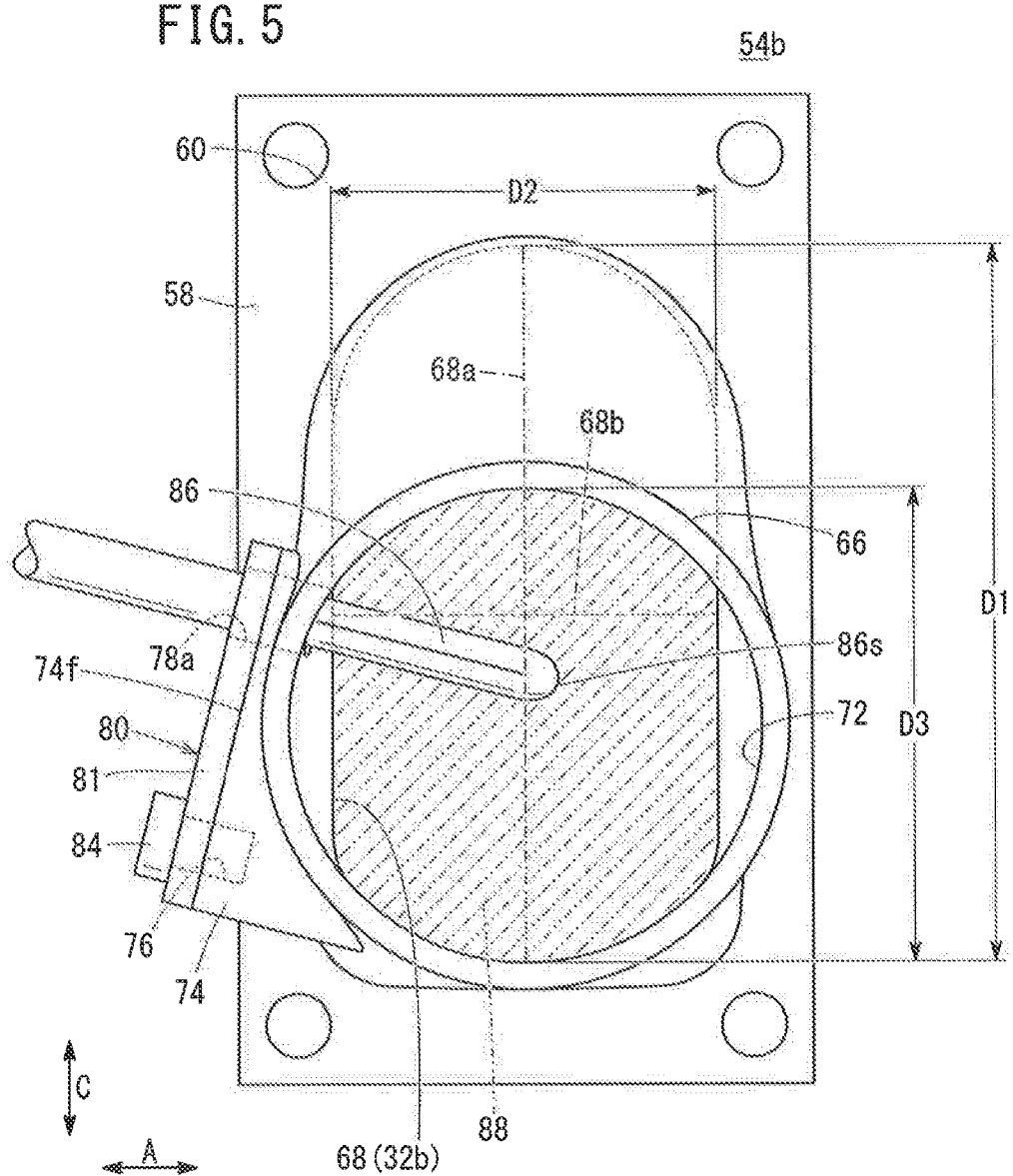
FIG. 5 is a front view showing the oxygen-containing gas discharge manifold member.

The flange 58 is formed integrally with one end of a substantially cylindrical body 66. As shown in FIGS. 4 and 5, the body 66 has a non-circular, e.g., substantially rectangular first opening 68. The first opening 68 is opened to an end of the flange 58, and connected to the oxygen-containing gas discharge passage 32b. The first opening 68 has a non-circular shape having a major axis 68a and a minor axis 68b. The first opening 68 and the oxygen-containing gas discharge passage 32b have the same shape.

As shown in FIG. 1, the body 66 is connected to a circular external pipe 70, and has a circular second opening 72 connected to the circular external pipe 70. Though not shown, external devices such as an open/close valve and fluid pressure devices are connected to the circular external pipe 70. As shown in FIG. 5, an opening dimension D1 of the first opening 68 along the major axis 68a is larger than an opening dimension D3 of the second opening 72 (diameter of the circular second opening 72). To put another way, the first opening 68 is longer than the second opening 72 in the vertical direction (the direction indicated by an arrow C which is parallel with the major axis 68a). The opening dimension D3 of the second opening 72 (diameter of the circular second opening 72) is larger than an opening dimension D2 of the first opening 68 along the minor axis 68b.

As shown in FIG. 4, an attachment frame (thick portion) 74 is formed integrally with a part of the outer circumference of the body 66. The attachment frame 74 protrudes outwards from an outer circumference of the body 66. A screw hole 76 is formed in the attachment frame 74. The screw hole 76 neither penetrates the body 66 nor reaches the inside of the body 66. The attachment frame 74 forms a flat surface 74f. A screw hole 76 and a hole 78 are formed in parallel in this flat surface 74f. The screw hole 76 is formed at a lower position than the hole 78. As shown in FIG. 5, the flat surface is at an angle with respect to the major axis 68a and the minor axis 68b of the first opening 68. The hole 78 penetrates the body 66 and the attachment frame 74. When measured from the body 66, a portion on the attachment frame 74 where the screw hole 76 is formed is at a higher position than a portion on the attachment frame 74 where the hole 78 is formed.

A sensor bracket 81 of a sensor member 80 is attached to the attachment frame 74. The sensor bracket 81 has a hole 82. A bolt (attaching screw) 84 inserted into the hole 82 is screwed into the screw hole 76. A rod shaped temperature sensor 86 is provided for the sensor bracket 81. The temperature sensor 86 is inserted into the hole 78, and is provided inside the body 66. The temperature sensor 86 is inserted into the hole 78 from the upper side to the lower side in the direction of gravity and is at an angle with respect to the direction of gravity. Thus, the temperature sensor 86 is held by the sensor bracket 81 so that the closer to the front end (an end having a sensing part 86s) the position on the temperature sensor 86 is, the lower temperature sensor 86 is located. In this way, a water droplet on the temperature sensor 86 falls from the front end of the temperature sensor 86 because of gravity and thus is certainly prevented from flowing back to a cable connected to the temperature sensor 86. A seal member (for example, O-ring, liquid seal) is provided between the temperature sensor 86 and the hole 78. The temperature sensor 86 is inserted into the oxygen-containing gas discharge manifold member 54b along the surface of the first end plate 18a.

As shown in FIG. 5, the first opening 68 and the second opening 72 have different opening shapes. The first opening 68 is offset upward from the center of the second opening 72. In a front view of the first end plate 18a, an area 88 where the opening shape of the first opening 68 and the opening shape of the second opening 72 are overlapped with each other is formed. The sensing part 86s at the front end of the temperature sensor 86 is provided in the area 88. The hole 78 opens, outside the area 88, on an inner circumferential surface of the body 66. In the front view of the first end plate 18a, the center of the first opening 68 in the width direction (the direction indicated by arrow A which is parallel with the minor axis 68b in FIG. 4) coincides with the center of the second opening 72 in the width direction. The sensing part 86s is positioned at an approximately central position of the first opening 68 and the second opening 72 in the width direction.

It should be noted that the oxygen-containing gas supply manifold member 54a, the fuel gas supply manifold member 56a, and the fuel gas discharge manifold member 56b have the same structure as the oxygen-containing gas discharge manifold member 54b except the attachment frame 74. The constituent elements that are identical to those of the oxygen-containing gas discharge manifold member 54b are labeled with the same reference numeral, and detailed description thereof is omitted.

Though not shown, a coolant supply manifold member and a coolant discharge manifold member are attached to the second end plate 18b. The coolant supply manifold member is connected to the coolant supply passage 34a, and the coolant discharge manifold member is connected to the coolant discharge passage 34b.

Operation of the fuel cell stack 10 will be described below.

Firstly, as shown in FIG. 1, an oxygen-containing gas is supplied from the oxygen-containing gas supply manifold member 54a of the first end plate 18a to the oxygen-containing gas supply passage 32a. A fuel gas such as a hydrogen-containing gas is supplied from the fuel gas supply manifold member 56a of the first end plate 18a to the fuel gas supply passage 36a.

In the meanwhile, coolant such as pure water, ethylene glycol, and oil is supplied from a coolant supply manifold member (not shown) of the second end plate 18b to the coolant supply passage 34a.

Therefore, as shown in FIG. 2, the oxygen-containing gas flows from the oxygen-containing gas supply passage 32a into the oxygen-containing gas flow field 46 of the cathode separator 30. The oxygen-containing gas moves along the oxygen-containing gas flow field 46 in the direction indicated by the arrow A, and the oxygen-containing gas is supplied to the cathode 42 of the membrane electrode assembly 26.

The fuel gas is supplied from the fuel gas supply passage 36a to the fuel gas flow field 44 of the anode separator 28. The fuel gas flows along the fuel gas flow field 44 in the direction indicated by the arrow A, and the fuel gas is supplied to the anode 40 of the membrane electrode assembly 26.

Thus, in the membrane electrode assembly 26, the oxygen-containing gas supplied to the cathode 42 and the fuel gas supplied to the anode 40 are consumed in electrochemical reactions at electrode catalyst layers 42b, 40b for generating electricity.

Then, after the oxygen-containing gas is supplied to, and partially consumed at the cathode 42 of the membrane electrode assembly 26, the oxygen-containing gas flows along the oxygen-containing gas discharge passage 32b in the direction indicated by the arrow B, and the oxygen-containing gas is discharged from the oxygen-containing gas discharge manifold member 54b (see FIG. 1). In the meanwhile, after the fuel gas is supplied to, and partially consumed at the anode 40 of the membrane electrode assembly 26, the fuel gas flows along the fuel gas discharge passage 36b in the direction indicated by the arrow B, and the fuel gas is discharged from the fuel gas discharge manifold member 56b.

Further, as shown in FIG. 2, the coolant supplied to the coolant supply passage 34a flows into the coolant flow field 48 between the cathode separator 30 and the anode separator 28. After the coolant flows in the direction indicated by the arrow A to cool the membrane electrode assembly 26, the coolant is discharged into the coolant discharge passage 34b. The coolant is discharged from the second end plate 18b.

In the embodiment of the present invention, as shown in FIGS. 4 and 5, the oxygen-containing gas discharge manifold member 54b has the non-circular first opening 68 and the circular second opening 72. The first opening 68 and the second opening 72 are connected to each other. The first opening 68 is connected to the non-circular oxygen-containing gas discharge passage 32b of the power generation cell 12, and the second opening 72 is connected to the circular external pipe 70.

The first opening 68 and the second opening 72 have different opening shapes, and the first opening 68 is offset upward from the center of the second opening 72. In the front view of the first end plate 18a, the area 88 where the opening shape of the first opening 68 and the opening shape of the second opening 72 are overlapped with each other is formed, and the sensing part 86s at the front end of the temperature sensor 86 is provided in the area 88 (see FIG. 5).

Therefore, the sensing part 86s of the temperature sensor 86 is provided stably in the area 88 where the oxygen-containing gas (fluid) flows between the first opening 68 and the second opening 72. Thus, the temperature (state) of the oxygen-containing gas can be checked easily.

Figure 6:
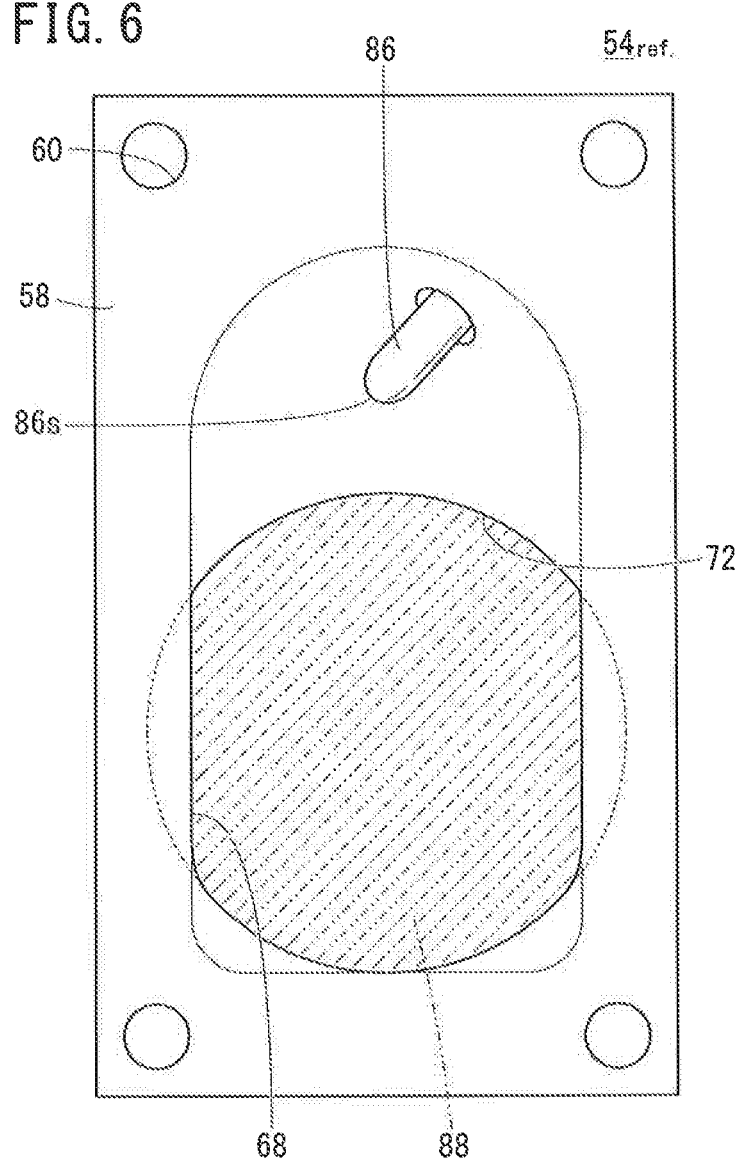
FIG. 6 is a front view showing an oxygen-containing gas discharge manifold member of a comparative example.

Specifically, temperatures were measured using the oxygen-containing gas discharge manifold member 54b of the present application and an oxygen-containing gas discharge manifold member 54ref. as a comparative example shown in FIG. 6. In the oxygen-containing gas discharge manifold member 54ref., the sensing part 86s of the temperature sensor 86 is positioned outside the area 88 where the opening shape of the first opening 68 and the opening shape of the second opening 72 are overlapped with each other. Since the area 88 also has the flow rate distribution and the temperature distribution, when the fluid flows at the high flow rate, temperature can be measured wherever the sensing part 86s may be disposed in the area 88. However, it is preferable to provide the sensing part 86s of the temperature sensor 86 at a central position in the area 88 when the fluid flows at the low flow rate, because flow of fluid could become weak in an outer zone of the area 88.

Figure 7:
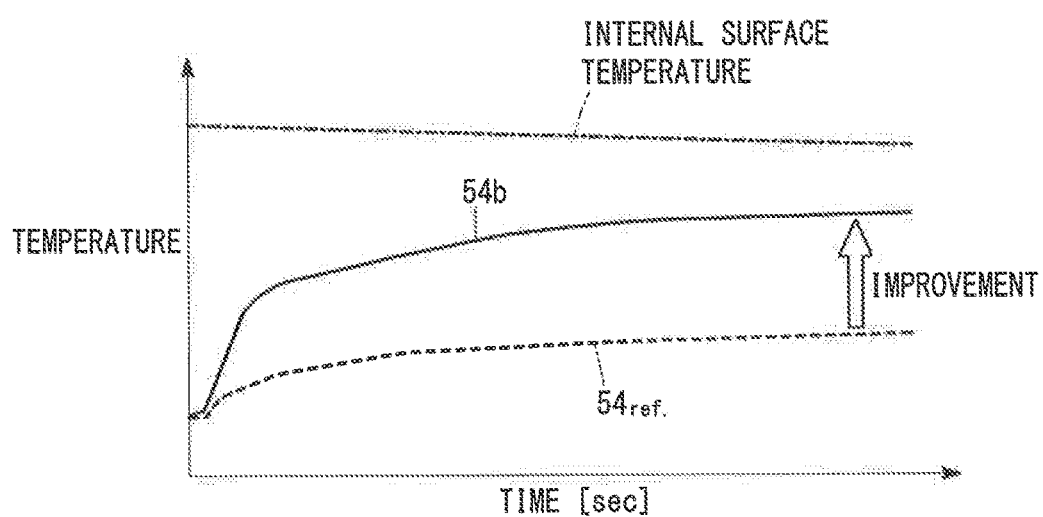
FIG. 7 is a view showing the change of detected temperatures of the oxygen-containing gas discharge manifold member of the present application and the oxygen-containing gas discharge manifold member of the comparative example.

In this regard, operation of the fuel cell stack 10 was stopped, and the scavenging process of the oxygen-containing gas flow field 46 was performed using the dry air, and the temperature of the oxygen-containing gas discharge passage 32b was detected. As a result, as shown in FIG. 7, in the oxygen-containing gas discharge manifold member 54b of the present application, the temperature detected by the temperature sensor 86 had a value close to the temperature value in the surface of the membrane electrode assembly 26.

In contrast, in the oxygen-containing gas discharge manifold member 54ref., since the sensing part 86s of the temperature sensor 86 is provided outside the area 88, particularly when the oxygen-containing gas flows at the low flow rate, the sensitivity lowers. For this reason, in the comparative example, the temperature detected by the temperature sensor 86 was considerably lower than the temperature in the surface of the membrane electrode assembly 26.

In the embodiment of the present invention, the sensing part 86s of the temperature sensor 86 is provided within the area 88. Therefore, with the simple and economical structure, it becomes possible to perform measurement by the temperature sensor 86 with a high degree of accuracy advantageously.

In the embodiment of the present invention, the sensor member 80 is attached to the oxygen-containing gas discharge manifold member 54b. However, the present invention is not limited to this structure. For example, the sensor member 80 may be provided for at least one of the oxygen-containing gas supply manifold member 54a, the fuel gas supply manifold member 56a, the fuel gas discharge manifold member 56b, the coolant supply manifold member, and the coolant discharge manifold member.

Further, the sensor member 80 is not limited to the temperature sensor 86. Any of various types of sensors such as a pressure sensor, a moisture sensor, a hydrogen sensor, or an oxygen sensor may be used as the sensor member 80. The attachment structure for the sensor member 80 is not limited to the embodiment of the present invention as long as the sensing part 86s is positioned within the area 88.

While the invention has been particularly shown and described with a reference to a preferred embodiment, it will be understood that variations and modifications can be effected thereto by those skilled in the art without departing from the scope of the invention as defined by the appended claims.

What is claimed is:

1. A fuel cell stack including a plurality of power generation cells which are stacked together in a stacking direction, and end plates provided at both ends of the power generation cells in the stacking direction, the power generation cells each formed by stacking a membrane electrode assembly and a separator, the membrane electrode assembly including electrodes and an electrolyte membrane interposed between the electrodes,
   wherein a fluid passage extends through the power generation cells, for allowing a reactant gas or a coolant to flow in the stacking direction of the power generation cells;
   a manifold member connecting the fluid passage and an external pipe is provided for one of the end plates;
   the manifold member has a first opening, having a first shape, connected to the fluid passage, and a second opening, having a second shape different from the first shape, connected to the external pipe; and
   a sensing part of a sensor member for detecting the state of the fluid disposed through a side wall of the manifold member between the first opening and the second opening and extending into the manifold member to an area in which the first shape and the second shape are partially overlapped from a front view of one of the end plates;
   wherein in a front view of one of the end plates, the first opening is offset upward from the center of the second opening, and
   wherein in a front view of one of the end plates, side portions of the second opening are disposed further to the left and right of respective sides of the first opening.

2. The fuel cell stack according to claim 1, wherein the sensor member has a rod shape, and oriented in a direction intersecting with a direction in which the fluid flows.

3. The fuel cell stack according to claim 1, wherein the sensor member includes a temperature sensor having a rod shape, and the temperature sensor is disposed at an angle with respect to a direction of gravity.

4. The fuel cell stack according to claim 1, wherein the sensor member includes a sensor bracket that is attached to the manifold member,
   the sensor member is provided closer to one end of the sensor bracket than to the other end of the sensor bracket,
   an attaching screw that is screwed into the manifold member is provided closer to the other end of the sensor bracket than to the one end of the sensor bracket.

5. The fuel cell stack according to claim 4, wherein the manifold member includes
   a hollow cylindrical body having the second opening, and
   a thick portion that protrudes outwards from an outer circumference of the hollow cylindrical body,
   a screw hole into which the attaching screw is screwed is formed in the thick portion.

6. The fuel cell stack according to claim 1, wherein the first opening has a non-circular shape with a major axis and a minor axis,
   a length of the first opening along the major axis is longer than a length of the second opening.

7. The fuel cell stack according to claim 1, wherein the sensing part is placed at an approximately central position of the first opening and the second opening in a width direction.

* * * * *